Figure 1:
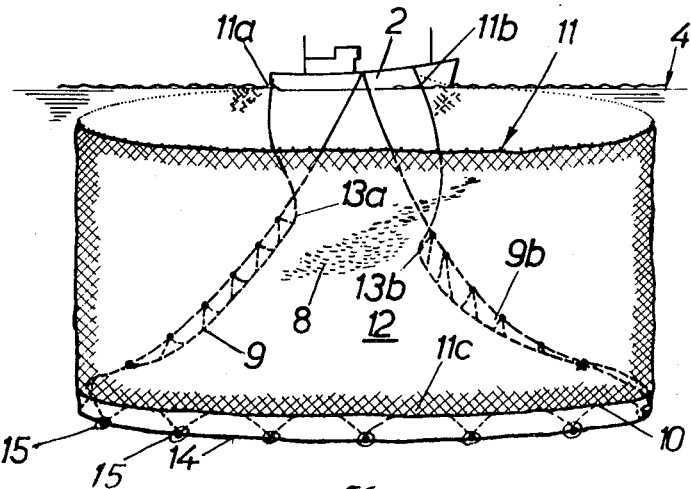

United States Patent

[11] 3,604,139

[72] Inventors Paul Strom
5302 Strusshanm;
Erling Allers, Salasen 43,, 5050 Nesttun, both of, Norway
[21] Appl. No. 823,373
[22] Filed May 9, 1969
[45] Patented Sept. 14, 1971

[54] APPARATUS FOR SEINE PURSING AND METHOD FOR PURSING A SEINE THEREBY
13 Claims, 6 Drawing Figs.
[52] U.S. Cl. .................................................. 43/4.5, 43/8, 43/14
[51] Int. Cl. .................................................. A01k 73/12
[50] Field of Search .................................................. 43/4.5, 8, 14, 6.5, 43.11; 254/137, 138, 167, 168

[56] References Cited
UNITED STATES PATENTS
1,413,552 4/1922 Yancey .......................... 43/8
2,677,528 5/1954 Dahl .............................. 254/137
2,733,531 2/1956 Puretic ......................... 43/8
3,034,767 5/1962 Gordon ......................... 43/8 X
3,314,184 4/1967 Lerch ........................... 43/6.5 X Primary Examiner—Warner H. Camp
Attorney—Waters, Roditi, Schwartz & Nissen ABSTRACT: A submersible winch assembly for pursing a Seine includes a supporting housing, a spool device rotatably supported in the housing, a motor supported in the housing operatively connected to the spool, opening means in the housing for admitting one or both ends of the Seine-pursing line on to the spool device, and suspension means for supporting the winch assembly from a fishing vessel in a suspended submerged position in the vicinity of the bottom level of the Seine, and means for transmitting power from a source on the vessel to the motor, including means for remotely controlling and operating the winch in submerged position from the fishing vessel.

APPARATUS FOR SEINE PURSING AND METHOD FOR PURSING A SEINE THEREBY

The present invention relates generally to seine pursing and has for its primary object the provision of means, whereby the pursing of a seine can be accomplished effectively and without raising the seine and the leadline before the pursing of the seine is substantially completed, thereby avoiding the well-known opening which forms itself between and under the respective end sections of the seine.

By purse seining with a ring seine it is usual, after the seine is set out in the sea in a ring, to attach both ends of the seine to the fishing vessel, and immediately to initiate the pursing together on the bottom side of the seine in order to trap the fish inside the more or less bag-shaped purse seine. Conventionally this is carried out in that the bottom side of the seine is pursed together by pulling in the pursing line running through the well-known rings attached to bridles fastened to the leadline of the seine, whereby the seine is pulled towards and upwardly to the fishing vessel. By means of a separate winch gear on the boat, the pursing line is stacked on the boat.

During the recent years there has been developed very large purse-seines, having depths of more than 100 fathoms with correspondingly greater lengths. Such seines require large forces in order to carry out the pursing. Not only are large forces required in order to purse the seine together, but substantial force is also required to hoist the bottom sections of the seine upwardly towards the fishing vessel, particularly during the last part of the pursing. Large, modern seines cause, in fact, not only difficulties proportionally with the size, but the difficulties increase progressively since in addition to the size and weight of the seine itself come other problems, such as increased drag in the seine net, due to streams in the sea, winds, etc., and the inevitable requirement to increase the size of all lines, winches, etc.

An inherent and severe drawback or shortcoming with connectional purse seine fishing, a shortcoming which is proportionally greater with larger seines, is that the fish during the pursing can leave the seine not only in the downwards direction, but also sideways between the respective two opposed end-edges of the purse-seine. During the pulling in of the purse line there will be formed a substantially triangular lateral opening between the end sections of the seine. Quite frequently the entire catch leaves the seine through this triangular opening from under the boat before the pursing is accomplished.

These problems and shortcomings with conventional purse seine fishing have been acknowledged by fishermen, and several proposals have been made with the aim to improve the pursing and to avoid the bottom sides of the seine from being pulled upwards thus enlarging the opening between the opposed ends of the seine.

In accordance with a proposal shown in U.S. Pat. No. 2,570,285 a telescopically extendable upright attached to the fishing boat is used, said upright during the pursing extending from the boat and all the way down to the bottom of the seine, a guide means or pulleys being positioned at the bottom of the upright receiving the respective end sections of the purse line in order to subject the purse line to a pulling force pointing substantially horizontally with the aim that the purse seine shall not be lifted during the pursing operation. It should be obvious that the usual fishing vessel would not be able to carry a device or structure of this kind, since it would be much too large, heavy and expensive. Furthermore, it would be impossible to adapt this principle for use in connection with modern purse seines having a depth in the range of 40 to 100 fathoms.

Another proposal for solving the problem of the hoisting of the seine mass involves a concept of utilizing two fishing boats in connection with the pursing of the seine, each boat pulling in each respective end of the pursing line in opposite directions such that the bottom side of the seine shall be pursed together with a relatively small incline or slope along the pursing line. It is obvious that if the pursing line rises with a small angular descent up to the boats, these must be located quite far away from each other, particularly if the seine is deep, for instance 60 to 100 fathoms. In connection with modern purse seining it is, for practical reasons, impossible to utilize a such method, firstly because the use of two fishing boats would prove unprofitable, secondly because the method would require too much fishing area. Moreover, the fishing boats would lose control of the movements of the purse seine such that the purse seines easily could drift away.

The principle aim of the present invention is to provide a device by which the purse seine can be speedily and effectively pursed together and at the same time eliminate or reduce the creation of an undesired opening between the end sections of the seine, and the hoisting up of the seine during the pursing operation.

The seine-pursing apparatus in accordance with the invention comprises a submersible winch assembly including a supporting housing, a drum or spool rotatably supported in the housing and operatively connected with the spool, an opening in the housing for admitting a seine-pursing line on to the spool, attachment means for supporting the winch assembly from a fishing vessel in a suspended submerged position in the vicinity of the bottom level of the seine, conduit means for transmitting power from a source on the vessel to the motor, means for attaching a further line to the winch assembly, and means for remotely controlling the winch in submerged position from the fishing boat.

As will be understood, the inventive concept is based on the idea of providing a submersible pursing winch by which the pursing of the purse line can be carried out in situ, i.e. at the bottom of the seine instead of at the fishing boat.

The invention results in several important advantages during purse seine fishing. The main advantage is, as will be understood, that the pursing of the seine can take place substantially at the same elevation or level as the path of the pursing line along the lead line on the seine. Thereby not only can the pursing take place more effectively and speedily, but it will also demand less force since the conventional lifting of the purse seine during the pursing. Furthermore the well-known opening between the side edges of the opposed ends of the seine is eliminated since the side edges of the seine can extend all the way from the sea surface down to the bottom of the seine along each other or even with a certain overlapping making it almost impossible for the fish to escape.

Figure 5A:
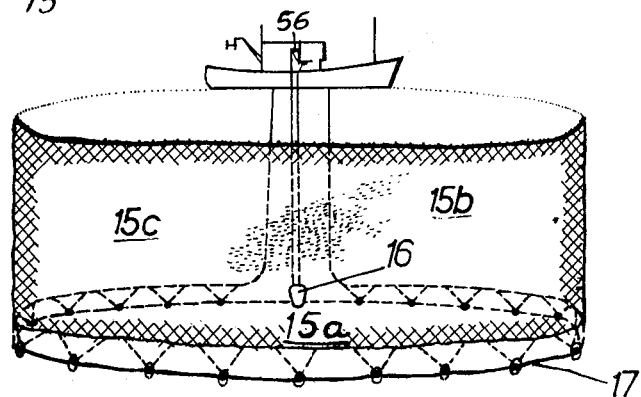
Figure 5B:
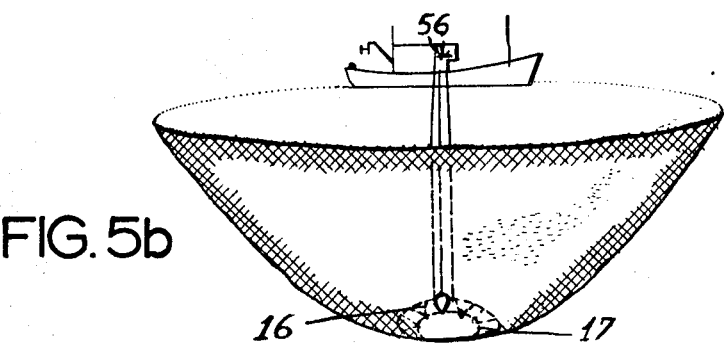
Figure 2:
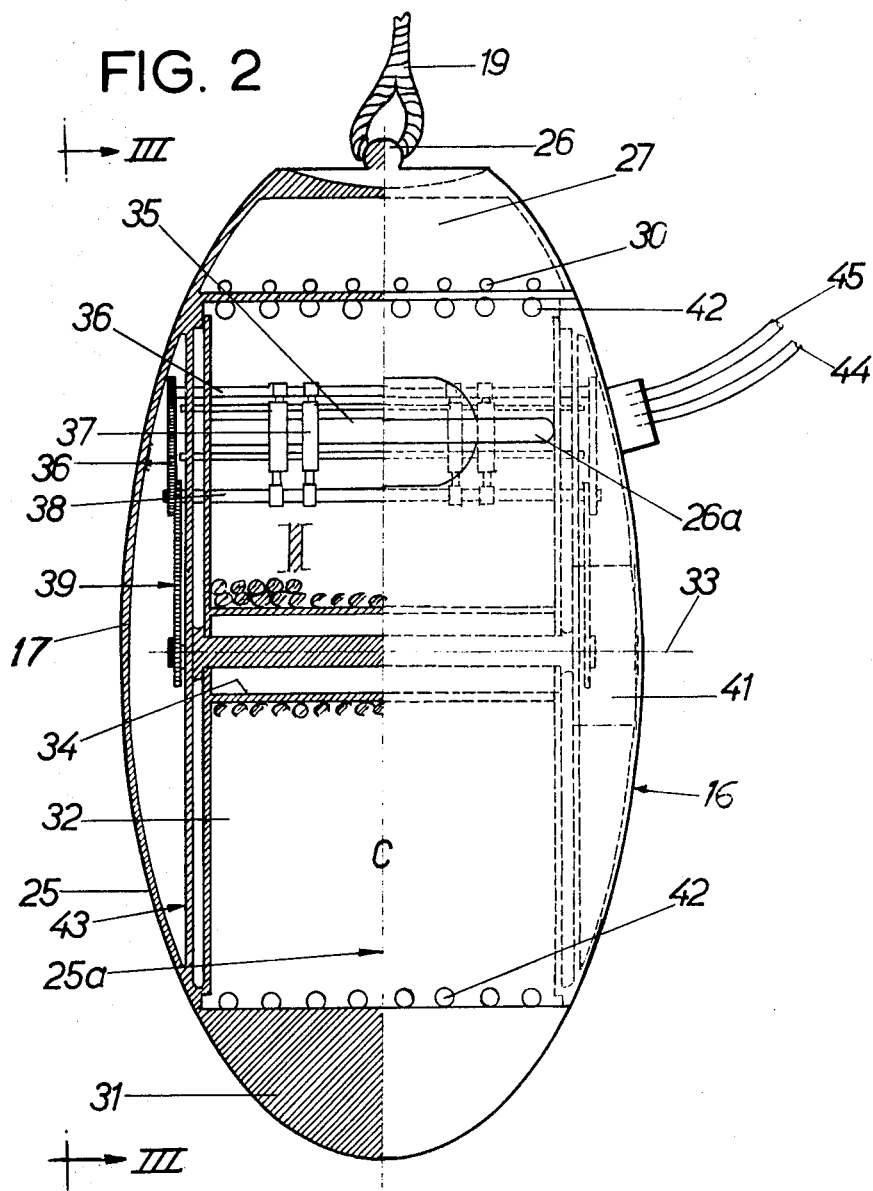
Figure 3:
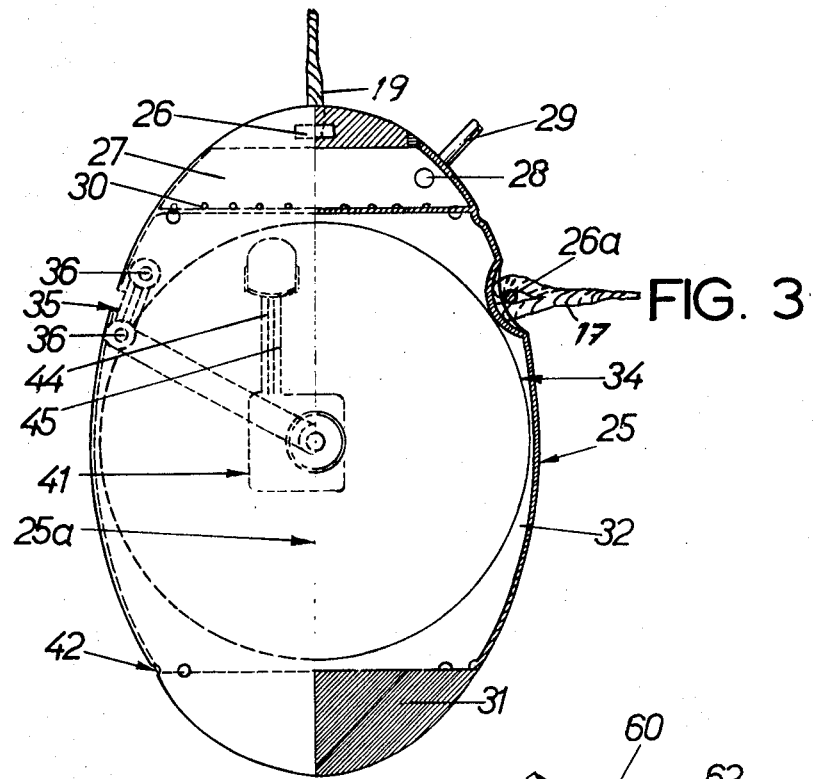
Figure 4:
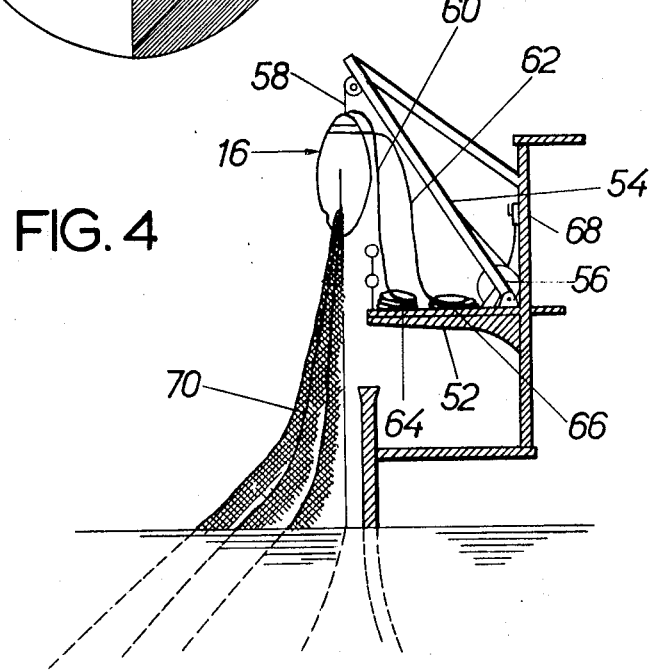

These and other advantages of the invention together with other features will become more apparent from the following description, in connection with the accompanying drawings illustrating an embodiment of an apparatus in accordance with the invention, wherein:

FIG. 1 is a schematic perspective view illustrating conventional pursing of a ring seine being set in the sea, FIG. 2 is an elevation view of an apparatus in accordance with the invention, the left half being shown in section, FIG. 3 is a reduced elevational view taken from the side III—III shown in FIG. 2, the right half of the apparatus being shown in section, FIG. 4 illustrates the apparatus during fishing and being suspended from a derrick positioned on a fishing vessel, and FIGS. 5a and 5b illustrate the mode of the pursing operation utilizing an apparatus in accordance with the invention.

In the following shall initially be given a detailed description of conventional pursing, thereafter shall be described in detail an embodiment of an apparatus in accordance with the invention, and finally shall be described the pursing operation carried out with an apparatus in accordance with the invention.

In FIG. 1 is shown a purse-seining vessel 2 working with a purse seine 11 which has been set out in the sea 4 to attain the usual ring-shape in order to confine a school of fish 8, the one end 11a of the seine being positioned and attached to the aft end of the vessel, the opposite end 11b being attached to the fore-end of the boat. Conventional pursing of the seine has been initiated. As illustrated there exists a rather large substantially triangular lateral opening 12 in the seine ring closure between the ends 11a and 11b from the top of the seine down to each of the bottom corners 13a and 13b of the seine ends and furthermore along the sloping leadlines 9a and 9b all the way down to a bottom edge 10. During the pursing operation these sections of the seine are as shown somewhat schematic being pulled upwards and towards the pursing vessel and thereby maintaining the opening 12. The pursing operation must, due to the large inertia forces and weights involved, take place relatively slowly, since large sections of the seine net must necessarily be pulled upwards and towards the vessel, simultaneously as the seine—as aimed at—is pursed together also requiring a certain force. During the pursing the purse line 14 slides through the rings 15, attached at certain spaced intervals to the so-called bridles attached to the leadline of the seine. As a result of this hauling operation, the vessel will tend to be drawn towards the center of the seine ring by the pursing line before the seine is sufficiently pursed together to be hauled up to the vessel. In order to avoid drift of the vessel into the seine ring, a small motor skiff having a powerful engine is commonly utilized which tugs the vessel sideways out of the seine. Even with a powerful motor skiff having an engine of 100 hp. or more it is very difficult to tug the fishing vessel sideways.

In order to reduce the size of the undesired opening 12 under ideal fishing conditions the ends 11a and 11b of the seine can be attached closer together towards the center of the vessel, but usually not too close together in order not to risk that the seine gear becomes entangled.

THE APPARATUS OF THE INVENTION

A submersible pursing winch assembly in accordance with the invention is shown in FIGS. 2, 3 and 4. The apparatus 16 comprises a supporting cagelike housing 25, preferably substantially egg-shaped as shown and having elliptical cross sections, the longer axis 25a being the so-called vertical axis. On the upper portion of the housing is provided an attachment eye 26 for the hoisting and support cable 19. Below the eye 26 is an upper chamber 27 provided with an inlet 28 for admitting a conduit hose 29 for compressed air, which chamber is provided with a number of peripheral jets 30 arranged for directing jets of compressed air substantially horizontally in a plane normal to the vertical axis 25a in order to create a raising curtain of air bubbles in the water with the aim to scare the fish back into the middle of the seine ring. It is noted, however, that the air-curtain means is optional in the apparatus in accordance with the invention.

At the lower end of the housing 25 is positioned a weight 31 in order by means of gravity to maintain the egg-shaped housing in substantially upright position when submerged and also to ensure a speedy submersion of the apparatus. The supporting housing is assembled from two or more parts, at least two main parts comprising two halves fitted together along the vertical symmetrical center axis C, preferably with screwbolts (not shown). Between the chamber 27 and the weight 31 is provided a central chamber 32 wherein is journaled about a transverse axis on supports 43 a winding drum 34 for receiving the purse line 17. The housing 25 is provided with an attachment eye 26a for the one end of the purse line 17 while the opposite other end of same passes into the housing 25 through a slit opening 35 and is attached to the drum 34. On the inside of the opening 35 adjacent same are, on parallel worm gears 36, 36, reciprocating guides 37 to ensure uniform appliance of the purse line 17 onto the drum 34. Drive chains 38 and 39 provide transmission between the driving wheels on the worm gear 36 and shaft 33 for the drum 34. The reference number 41 designates a motor for driving the drum 34, preferably a fluid-driven motor directly coupled to the drum shaft 33 and being supplied with pressurized driving fluid through flexible conduits 44, 45 from a source on the fishing vessel. Alternatively, a compressed air motor could be utilized in which case the discharge air could be utilized to provide the air bubble curtain. The housing is furthermore provided with a number of openings 42 to provide for free circulation of water in and out of the housing. The upper set of openings 42 will let out the air when the apparatus is submerged in the sea and the lower set of openings 42 will let out the water when the apparatus is hoisted to a position above the sea level.

FIGS. 4, 5a and 5b illustrate the mode of the pursing operation when utilizing an apparatus and the method in accordance with the invention.

FIG. 4 shows a transverse sectional view through a part of a fishing vessel, said vessel being supplied with sufficient implements to operate the apparatus in accordance with the invention, including an operating platform 52, a derrick 54 with a motor winch 56 furnished with a hoisting cable 58 in which is suspended the submersible winch apparatus 16. Shown is also pressurized-fluid conduits 60, 62, the supply of which is wound on the platform in the form of coils 64, 66, and a panel 68 with various control means for operating the submersible winch apparatus 16 at all levels.

In FIG. 4 the winch apparatus 16 is shown in hoisted position subsequent to the pursing and hoisting or drying of the purse seine 70, the pursing rings and the bridles hanging below the submersible winch apparatus.

When setting the seine, the submersible winch apparatus 16 is hanging in the position shown in FIG. 4, but the seine however, will of course not be hanging as shown but instead prior to this stage be hauled, for instance only by means of a power block, and stored at another place on board the vessel.

In order to provide thorough understanding of the invention the purse seine is illustrated in FIGS. 5a and 5b as having the same height and length as the seine illustrated in FIG. 1 and to simplify matters the seine is shown having the same height at the end sections 15a and 15b as along the middle section 15c, although an actual seine usually is shaped to have inclined bottom edges, at least at the one end section 15b, including the so-called purse. As a result of the present invention, however, the seine can be advantageously made with less inclined bottom edges than hitherto, due to the new way of pursing. Thus the purse seine shown has a substantially uniform height and can be compared with a closed cylindrical surface at the moment of fishing when the pursing of the bottom side is initiated.

In FIG. 5a the seine has just been set. As shown with reference number 16 the apparatus of the invention is submerged to a level substantially corresponding with the course or path of the purse line 17, and the concept of the invention involves separate and initial pursing of the bottom side of the seine by means of the submersible winch assembly, which as mentioned is remotely controlled from the vessel. The pursing of the bottom side of the seine is carried out in the following manner:

The end section of the purse line, extends during the setting of the seine upwards to a releasable attachment at the topside edge of the seine. Before the pursing apparatus 16 is submerged, the purse line 17 is released from the seine and is transferred to the attachment on the submersible winch housing. The other end of the purse line 17 extends all the time into the apparatus and is permanently attached to the winding drum 34. When the apparatus now is lowered from the position illustrated in FIG. 4 down to the submerged position illustrated in FIG. 5a, the purse seine will present a substantially cylindrical ring-shape as shown in FIG. 5a and the pursing of the seine can be initiated.

The winch motor inside the apparatus is actuated by means of the remote control from the boat, whereupon the purse line 17 will be pulled in by the winch and wound on the drum 34. The pursing of the seine will be carried out as illustrated in FIG. 5b, in other words without any substantial upward movement of the seine net since the pursing and thereby the closing of the bottom side of the seine can be completely accomplished before the actual hauling or retrieving of the seine is initiated. It is, however, also possible to initiate the hauling of the net before the pursing is completed. As will be understood by comparing FIGS. 1 and 5a, one may by the invention utilize the depths of the seine much better than by the conventional method illustrated in FIG. 1. This is particularly important when the task is to catch a school of fish standing deep in the water, for instance two-thirds of the distance from the sea surface to the bottom edge of the net. By means of the invention not only is the bottom side of the seine closed much faster and better, but the very unfortunate triangular lateral opening between the side edges 15b and 15c on the seine is eliminated.

Subsequent to the closing of the bottom side of the seine to a suitable degree—illustrated in FIG. 5b—the spooling of the pursing line is discontinued by stopping the winch motor, whereupon the apparatus 16 together with the pursed bottom side of the seine is hoisted up to the vessel by means of the winch 56, into the operational position illustrated in FIG. 4. The purse line 17 is now wound on the drum 34.

In order to eliminate the escape opening for the fish at the bottom side of the seine while the pursing takes place, the apparatus 16 can be provided with means for letting out compressed air as described, providing a curtain of air bubbles extending from the apparatus 16 upwards in the area between the side edges 15b and 15c of the seine.

It is assumed that the invention in view of the foregoing description in conjunction with the drawings, showing an embodiment of an apparatus in accordance with the invention, will be quite apparent to those skilled in the art. It is to be understood, however, that the invention can be realized through various types of apparatuses. Thus, while the described embodiment is adapted to purse at one single end of the purse line, there is no objection to purse at both ends of the purse line and provide the submersible winch assembly with two purse line drums for this purpose. Other modifications are also easily comprehended by the spirit of the invention as herein described and within the scope of the appended claims.

What is claimed is:

1. Method for pursing a seine utilizing an apparatus comprising a submersible winch assembly including a supporting housing, spool means rotatably supported in the housing, a motor supported in the housing and operatively connected to the spool means, opening means in the housing for admitting the circulation of water in and out of the housing and admitting a seine-pursing line onto the spool, attachment means for supporting the winch assembly from hoisting device on a fishing vessel, means for transmitting power from a source on the vessel to the motor, means for attaching a further line to the winch assembly, and means for remotely controlling the winch in submerged position from the vessel, said method comprising the steps of attaching the one end of the purse line onto the spool means, attaching the other end of the purse line onto the housing, subsequent to that the seine has been set, submerging the apparatus to a level substantially corresponding to the bottom side of the seine, starting the motor thereby pursing the purse line and winding same onto the spool means, continuing the pursing until the seine is substantially pursed, hoisting the apparatus up above the water together with the purse rings, the bridles and the bottom part of the seine net, whereafter accomplishing the hauling of the seine up aboard the vessel.

2. Method for pursing a seine as defined in claim 1, said spool means comprising one first spool section and one second spool section, said method comprising the steps of attaching the one first end of the purse line onto said first spool section, said further line comprising the other end of the purse line and which is attached to the second spool means subsequent to that the seine has been set, submerging the apparatus to a level substantially corresponding to the bottom side of the seine, starting the motor in the winch assembly thereby pursing the purse line from both ends of same and winding the two parts of the purse line onto said first and said second spool sections.

3. A method of pursing a seine comprising submerging a purse seine in a body of water, the purse seine being formed as a net having facing ends to define a ring-shaped enclosure whose lower edge is slidably attached to a purse line, submerging a winch in the body of water approximately at the level of the lower edge of the seine, connecting the purse line to the winch, driving the winch to wind the purse line on said winch so that the purse line is wound while submerged at the level of the lower edge of the seine to substantially close the net at said lower edge while bringing the facing ends into proximate relation whereafter the purse seine can be hoisted out of the water.

4. A method as claimed in claim 3 comprising controlling the drive of the winch from the surface of the body of water.

5. An apparatus for submersible pursing of a seine in the water, said apparatus comprising a submersible winch assembly including a supporting housing, a drum means rotatably supported in the housing, a motor supported in the housing drivingly connected with the drum means, opening means in the housing for admitting a seine purse line onto the drum means, attachment means for supporting the winch assembly from a fishing vessel and including means for submerging the winch assembly in the vicinity of the lower edge of the seine, means to hold said winch assembly upright in said submerged position, to locate said opening means in a position in which the purse line will be freely wound on said drum means, means for transmitting power from a source on the vessel to the motor, and means for remotely controlling the motor in submerged position of the winch assembly from the fishing vessel to haul in the purse line and wind the same on said drum means thereby to purse said seine.

6. Apparatus defined in claim 5, wherein the drum means has a capacity to receive the entire pursing line.

7. Apparatus defined in claim 5, wherein said housing is egg-shape, the longer axis of the egg-shaped housing being adapted to be positioned substantially vertically when the assembly is in the upright submerged operating position.

8. Apparatus defined in claim 7, wherein the attachment means for suspending the assembly comprises an attachment at the upper end of the egg-shaped housing, said means for holding the winch assembly upright including a weight at the opposite lowermost end of the housing for maintaining the assembly in said substantially upright position when suspended in a submerged operating position.

9. Apparatus defined in claim 8, wherein said drum means comprises a drum having a rotational axis extending normal to the longer axis of the egg-shaped housing.

10. Apparatus defined in claim 5, wherein the motor comprises a hydraulic motor, the means for transmitting power to the motor comprising flexible pressure fluid conduit means extending between a pressure-fluid source on the vessel and the motor.

11. Apparatus as defined in claim 10, said hydraulic motor being watertight, said supporting housing being provided with sufficient openings for enabling the surrounding water to flow in and out during submerging operations and water hoisting operations respectively.

12. A fishing vessel adapted to be operated with an apparatus as claimed in claim 5, said vessel incorporating a hoisting device supporting the winch assembly in suspended position at desired elevation, said vessel being provided with a hydraulic pressure-fluid source and means to receive and store a supporting cable of said attachment means, the control means and the power-transmitting means extending between the vessel and the winch assembly.

13. An apparatus as claim in claim 5 wherein said drum means comprises first and second drums each attached to an opposite end of said pursing line.